Jan. 29, 1963  R. BARKSTROM  3,075,339
CONVEYOR FOR CORN PICKERS
Filed Dec. 5, 1960  2 Sheets-Sheet 1

INVENTOR.
Reynold Barkstrom
Paul O. Pippel
Atty.

United States Patent Office 3,075,339
Patented Jan. 29, 1963

3,075,339
CONVEYOR FOR CORN PICKERS
Reynold Barkstrom, Moline, Ill., assignor to International Harvester Company, Chicago, Ill., a corporation of New Jersey
Filed Dec. 5, 1960, Ser. No. 73,603
8 Claims. (Cl. 56—98)

This invention relates to a new and improved conveyor for corn pickers.

Throughout the years since the development of the first machine type corn harvesters there has been the problem of conveying the corn and possibly stalk material through the corn harvesters from one location to another therein for the purpose of performing various operations on the corn following picking from the field and eventual deposit in a trailing wagon or other depository. The various conveyors used in corn harvesters have taken many forms and include fingered chains, auger conveyors, paddle wheels and many others. In certain situations these conveyors have proved to be inadequate. This is particularly true in cutoff type corn pickers wherein the ear is not immediately snapped from the stalk but rather the stalk is severed from the root portion and the ear with a substantial portion of the stalk is brought into the corn harvester. In this situation it is sometimes more difficult to move an ear of corn on a stalk through the machine than if the ear were separated therefrom. The present invention is concerned with a conveying device which is capable of positively moving ears of corn either separately or with their accompanying stalk from one position in a corn harvester to another position for further treatment by elements within the corn harvester.

A principal object of this invention is to provide a conveyor for crop material.

Another important object of this invention is to provide a cooperative disk conveyor in which crop material may be fed to one side and discharged at another side thereof.

Another and further important object of this invention is the provision of cooperative disks yieldably urged toward one another and rotated whereby crop material such as corn or ear corn and stalks may be fed into one portion of the disk conveyor and carried around and discharged at another portion thereof.

A still further important object of this invention is to supply a conveyor for harvesting machines in which cooperative disks are angled relative to one another in such a manner that at one portion crop material fed thereto will be positively gripped and at another portion the crop material will be automatically released from the angled disks.

A still further important object of this invention is to equip resiliently mounted cooperative disks for transporting crop material.

Another and still further important object of this invention is to provide cooperative disks for moving crop material and wherein the disks include deformable elastomer material on the surface thereof whereby various crop thicknesses may be equally grasped by the conveyor at one portion and discharged at another portion of the cooperative disks.

Other and further important objects and advantages will become apparent from the disclosures in the accompanying drawings.

Figure 2:
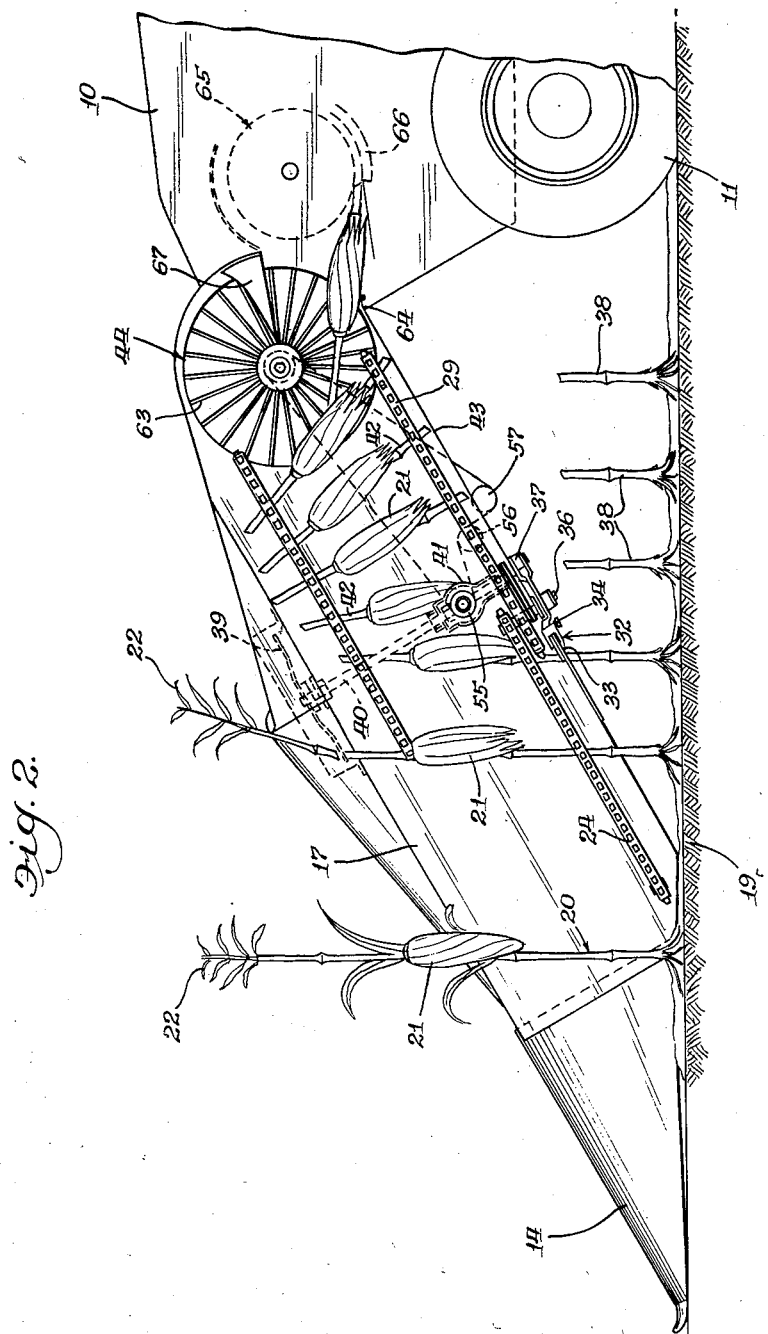
FIG. 2 is a sectional view taken on the line 2—2 of FIG. 1.

As shown in the drawings, the reference numeral 10 indicates generally a body or housing for a harvester such as a corn harvester. The body or supporting structure 10 is of the mobile type and is carried on wheels 11. It should be understood that only a part of the body or housing has been shown as it does not directly affect the invention shown and described herein. A corn gathering unit 12 is mounted on the forward end of the housing 10 and, as shown in FIG. 2, extends downwardly and forwardly therefrom. The gathering unit 12 includes spaced divider points 13 and 14 which engage the ground as "runners" and act to guide stalks therebetween into a converging throat 15. The gathering unit 12 also includes spaced side members 16 and 17 which constitute upward and rearward continuations of the ground-engaging gathering points 13 and 14 respectively. The throat 15 leads into an upwardly and rearwardly extending passage 18 disposed between the sides 16 and 17 of the gathering unit. It is within this passage 18 that the crop, such as corn, is initially gathered.

As best shown in FIG. 2, the ground line is depicted at 19 and growing out of the ground are a plurality of corn stalks 20 having ears 21 thereon to be harvested. Further, top foliage portions are shown at 22 on these same stalks of corn. The stalks 20 are aligned in a row so that when the machine traverses a field of standing corn the gathering units 13 and 14 flank the sides of such row, guiding the stalks into the converging throat 15 and thence into the upwardly and rearwardly extending passageway 18.

Figure 1:
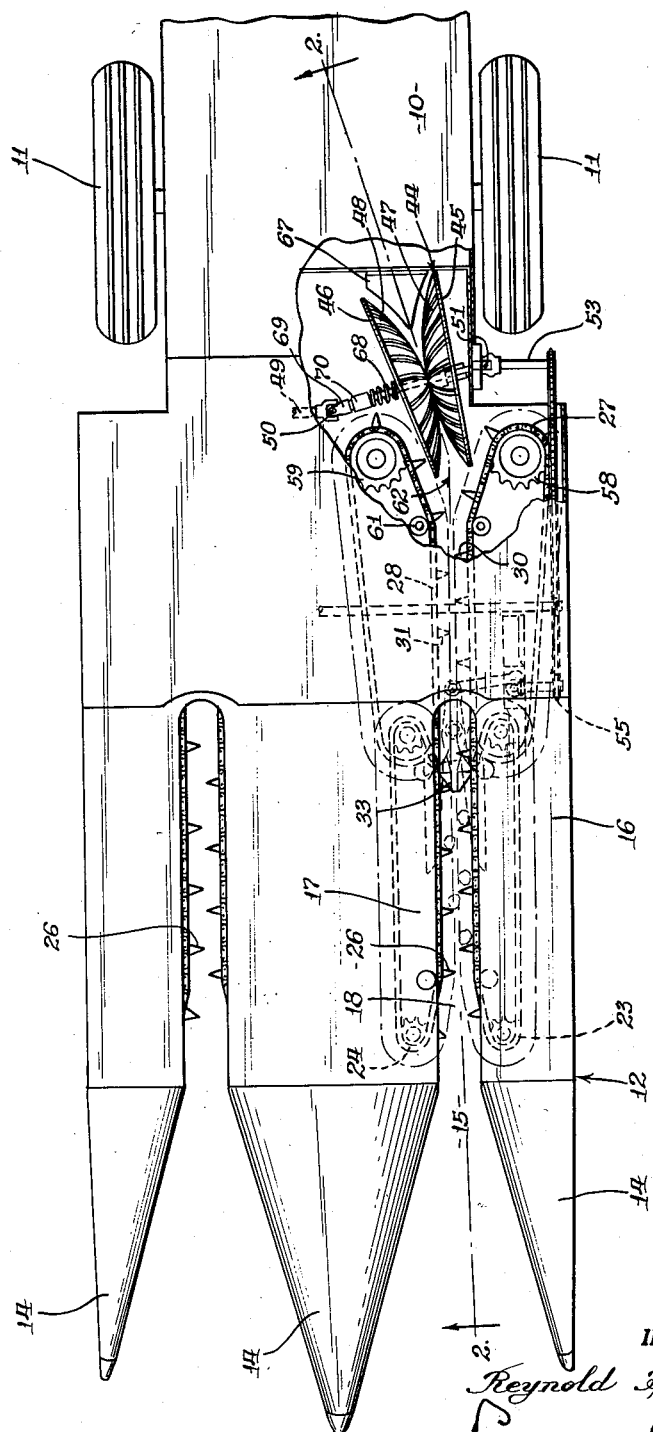
FIG. 1 is a portion of a top plan view of a corn harvesting unit having portions thereof broken away to depict the particular conveyor of this invention.

The gathering unit 12 includes a pair of cooperative fingered chains 23 and 24 which are mounted within the sides 16 and 17 of the gathering unit. As shown in FIG. 2, the gathering chain 24 is inclined upwardly and rearwardly and this is also true of the gathering chain 23. Outwardly projecting spaced apart fingers 25 and 26 are provided on the chains 23 and 24 respectively and project into the passageway 18 between the sides of the gathering unit. The fingers 25 and 26 are preferably intermittently spaced one with the other so that as the machine progresses forwardly through a field of standing corn stalks such as those shown at 20, they will be positively guided through the passageway 18 between the sides 16 and 17 of the gathering unit. The gathering chains 23 and 24 continue upwardly and rearwardly to a point approximately midway between the lower and upper ends of the gathering unit 12. The second half of the gathering unit, or that portion of the unit at the upper end thereof, is provided with vertically spaced-apart upwardly and rearwardly inclined gathering chains. As best shown in FIG. 1, the upper cooperative chains of such vertically spaced chains are shown at 27 and 28 and in FIG. 2 the vertical spacing of the two chains is clearly shown wherein the lower chain is indicated at 29 in spaced-apart position from the upper chain 28. As in the chains 23 and 24 these upper chains, both top and bottom, are provided with inwardly extending corn gathering fingers 30 and 31, as shown in FIG. 1. Across the juncture between the lower chain flight 24 and the lower chain flight 29, as shown in FIG. 2, there is included a sickle member 32 which comprises a reciprocating blade 33 mounted and slidable within a housing or guard 34. A pitman or rocker arm 35 is pivoted at 36 on the frame or side member 16 and by means of a drive member 37 reciprocation of the blade 33 is effected. It should, of course, be understood that the sickle 32 bridges the passage 18. As the corn picking machine moves forwardly through a field of standing corn the forward motion accompanied by the fingers of the cooperative gathering chains 23 and 24 guide and feed stalks 20 through the passageway 18. The stalks are thus cut by the passage bridging sickle 32 leaving a stubble 38 in the ground 19. The elevation of portions of the stalks 20 and their ears 21 continue through the upper portion of the passageway 18 by reason of the cooperative fingered chains 29, 27 and 28.

A disk-like blade 39 is disposed on the end of a shaft 40 which is driven through a gear box or the like 41. Drive is similarly imparted from the gear box 41 to the member 37 for the reciprocation of the sickle blade 33. The shaft 40 and its disk 39 are thus rotatably driven. The disk 39 is disposed between the gathering unit sides 16 and 17 at a position spaced above the reciprocating sickle 32. The disk blade 39 is sharpened at its periphery so that the stalks are topped when the machine passes thereover, thus dropping off the foliage portions 22 of the stalk and leaving only the now unsupported section 42 which is the mid-portion of the corn stalk 20. The stalk portions 42 are now only held in the gathering unit by the cooperative gathering chains in the upper end of the passage 18. These stalk portions ride or slide on a bottom 43, which is inclined upwardly and rearwardly in a path parallel to the upwardly and rearwardly inclined gathering chains.

It is, as previously stated, the primary purpose of the present invention to provide a conveyor means for delivering harvested corn to another portion of the corn harvester. The corn to be so conveyed are these sections 42 which form the mid-portions of the stalk and carrying the valuable ears 21. The conveyor is designated broadly by the numeral 44 and includes, as shown in FIG. 1, cooperative disks 45 and 46 which preferably have convexly shaped engaging surfaces of elastomer material as shown at 47 and 48 respectively. Drive is imparted to a shaft 49 leading to the disks 45 and 46 through a universal joint 50 and thence the drive is continued through the conveyor disks and thereupon to a second universal joint 51 and out to a sprocket 52 on the outer end of a shaft 53. A chain 54 passes over sprocket 52 and extends downwardly for drive to a sprocket 55 which delivers rotational drive to the gear box 41. Idler sprockets 56 and 57 are provided to give the chain suitable tautness. The gear box 41 divides the rotational drive delivered thereto for imparting rotation upwardly to the disk-like knife 39 through the generally vertically disposed shaft 40 and downwardly to effect reciprocation of the sickle 32 and drive for the gathering chains 24 and 29 as shown in FIG. 2.

As best shown in FIG. 1, the gathering chains 27 and 28 are provided with generally widely spaced-apart sprockets 58 and 59 respectively and are further equipped with idler sprockets 60 and 61 which together with their cooperative sprockets 58 and 59 define a V-shaped throat 62 between the upper ends of these fingered chains 27 and 28.

In the operation of the picker of this invention, the machine is propelled through a field of standing corn ready to be harvested and as will be apparent from the drawings, and particularly FIG. 2 thereof, the corn picker divider elements 13 and 14 pass closely adjacent a row of standing corn stalks 20 so that the gathering units flank the standing stalks. The stalks are guided into the converging throat 15 and thence into the scope of the lower gathering chains. Continued forward movement of the picker and upward and rearward movement of the gathering chains causes the stalks to be positively guided into the two vertically spaced-apart cutting elements, namely the topper cutting disk 39 and the reciprocating sickle 32 at the lower portion of the stalk. The ears of corn 21 on short lengths of stalk 42 are the only part of the crop actually entering the picker. The stubble 38 is left in the ground and the top 22 is removed so that a minimum of bulk will have to pass through the machine and yet there is a positive harvesting of all of the desirable ears of corn.

From this point on, the gathering chains at the upper end of the gathering unit which are vertically spaced apart and also flank both sides of the stalk sections 42 and their included ears 21 move this crop material upwardly and rearwardly. It is preferable that the lower level of gathering chains 29 of this upper group of chains move somewhat faster than the upper gathering chains 27 and 28 to thereby incline the crop material as it reaches the top as shown in FIG. 2. This inclination of stalk sections makes for easy reception of the sections by the cooperative disks 45 and 46. As shown in FIG. 2, the inner surface of the rubber or compressible material disk 46, like that of disk 45, is provided with slightly raised radial ribs 63 to further enhance gripping of the stalk or ear which passes therebetween. As previously explained, the disk-like members 45 and 46 are inclined relative to one another so that the forward ends adjacent the enlarged throat 62 at the top of the gathering chains are closest together and are positioned to receive the stalks delivered to the throat 62 as shown in FIG. 2. The crop material is thus moved rearwardly over a floor section 64 located beneath the conveyor 44 to a mechanism for further crop treatment such as to a threshing cylinder or the like 65 which cooperates with a concave 66 to effect a removal of the kernels of corn from the ear. The compressible surfaces 47 and 48 of the disks 45 and 46 tend to inherently grip the crop material at the forward or throat side 62 of the conveyor and at the diverging or widely spaced-apart ends of the disks 45 and 46 at the rear thereof the crop material is discharged automatically so that the succeeding element for treating the crop, whatever it may be, may easily grasp hold of the crop and pull it outwardly from the conveyor 44. In the event there is any tendency of the crop material to move upwardly and pass around the diverging disks 45 and 46 a stop member 67 is mounted on the frame structure 10 and extends between the disk members 45 and 46 thereby insuring that there is no material which will travel around the full circumference of the disks. A further feature of the device is a spring 68 provided on the shaft adjacent the disk 46 in such a manner that the disk 46 is urged into yieldable contact with its cooperative disk 45. This spring is shown mounted on the shaft 69 and by means of a collar 70 as a backup member the other end of the spring acts directly against the disk 46. The compressible surfaces of the disks permit positive grasping of different thicknesses of crop material. These surfaces 47 and 48 may be sponge rubber, air inflated, spring extended, or any one of several forms to provide for the positive gripping of ears and stalks therebetween.

It should be apparent that numerous details of construction may be varied throughout a wide range without departing from the principles disclosed herein and I therefore do not propose limiting the patent granted hereon otherwise than as indicated by the appended claims.

What is claimed is:

1. A conveying system for delivering a crop material from a first location to a second location comprising in combination:

a first conveyor unit, positioned between said first location and an intermediate location;

a second conveyor unit, positioned between said intermediate location and said second location, including a pair of disks, and journal means for supporting one of said disks in a first plane and the other of said disks closely adjacent said one disk in a second plane angularly offset with respect to said first plane, said second disk engaging said first disk, the angular relationship of said planes being such that the planes converge in the direction of said intermediate location and diverge in the direction of said second location;

and means for driving said first conveyor unit and for rotatably driving said disks, whereby crop material fed from said first conveyor unit to the disks at said intermediate location is carried around the disks and discharged adjacent said second location.

2. A system as set forth in claim 1 in which the disks are provided with elastomer engaging surfaces.

3. A system as set forth in claim 2 in which the engaging surfaces of the disks are provided with radial ribs.

4. A system as set forth in claim 1 in which the disks are spring urged together.

5. A system as set forth in claim 1 in which a stop member is disposed in the space defined by the disks at their widest spacing to insure crop discharge therefrom.

6. In a corn picker, the combination of: a supporting structure; a crop gathering unit carried on said supporting structure and extending in a direction to engage crop material, including cooperative gathering chains to convey crop material from an intake area to a discharge area; cooperative disks angularly positioned relative to each other, said disks converging in the direction of said discharge area and diverging in a direction away from said discharge area, the converging portion of said disks being positioned adjacent said discharge area; and means for rotatably driving said disks whereby the crop material is removed from the gathering chains at said discharge area and conveyed by said cooperative angled disks.

7. A combination as set forth in claim 6 in which the gathering unit is equipped with crop cutting means so that the cooperative angled disks convey a severed portion of the crop.

8. A system as set forth in claim 2 in which the elastomer surfaces are convex in shape.

References Cited in the file of this patent

UNITED STATES PATENTS

| | | |
|---|---|---|
| 1,182,149 | Douglass | May 9, 1916 |
| 2,414,512 | Ekholm | Jan. 21, 1947 |
| 2,542,646 | Fergason | Feb. 20, 1951 |
| 2,679,716 | Dunkle | June 1, 1954 |
| 2,713,240 | West | July 19, 1955 |